Patented June 22, 1937

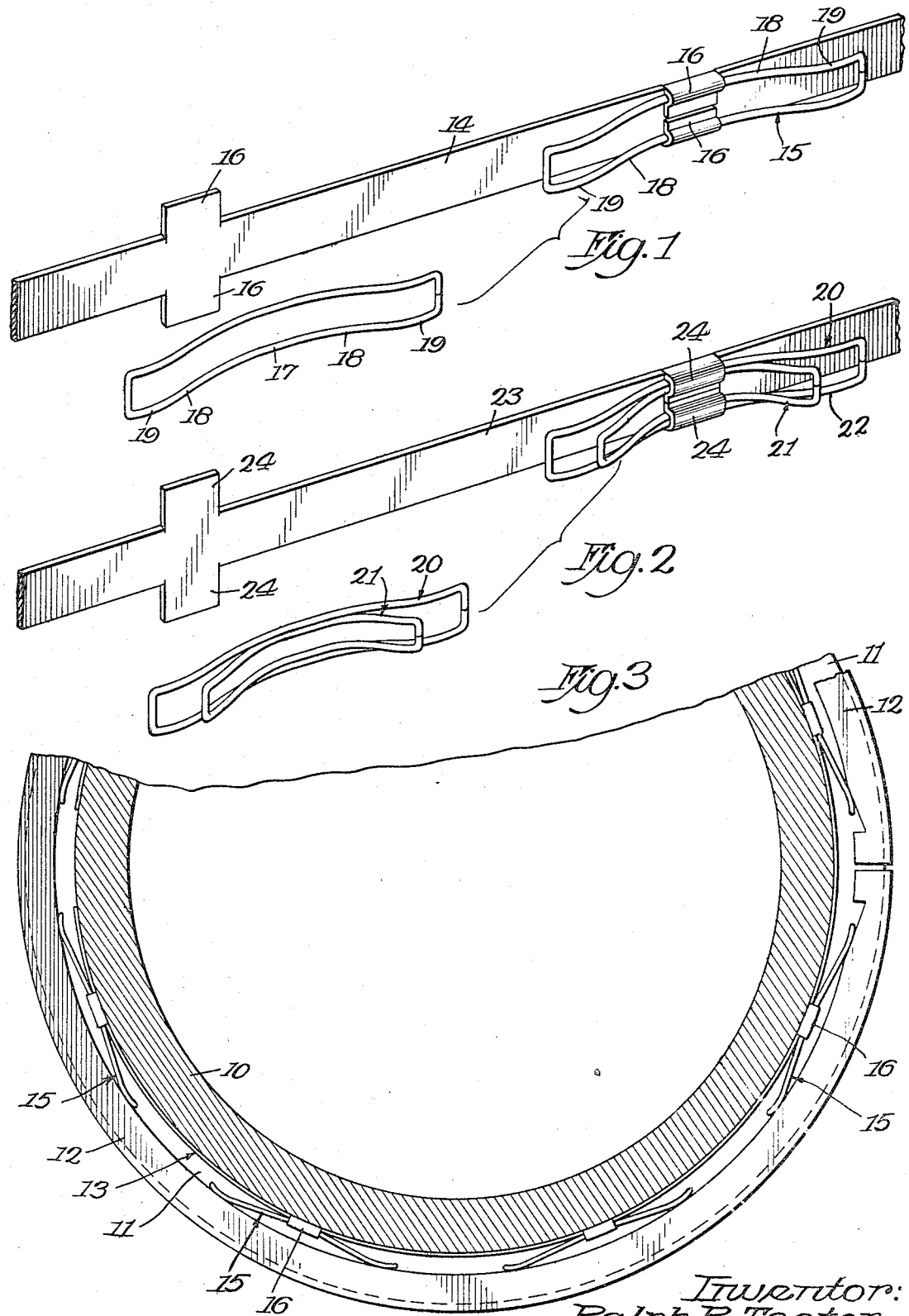

2,084,828

UNITED STATES PATENT OFFICE 2,084,828

PISTON RING EXPANDER

Ralph R. Teetor, Hagerstown, Ind., assignor to The Perfect Circle Company, Hagerstown, Ind., a corporation of Indiana Application September 23, 1935, Serial No. 41,708

4 Claims. (Cl. 309—43)

My invention relates to piston ring expanders for use in connection with and adapted to augment the expanding action of piston rings for internal combustion engines and the like.

One of the objects of my invention is to provide an improved piston ring expander of the foregoing character, which is simple in construction, is quite inexpensive to manufacture, and which is highly efficient and durable in use.

Another object of my invention is to provide an improved piston ring expander of the type embodying a supporting band adapted to be mounted in a piston ring groove and which carries a plurality of spaced spring members overlying the outer face of the band and adapted to expandingly engage the inner surface of the piston ring.

A more specific object is to provide an expander of the foregoing character wherein the spring members are formed of spring wire constructed and arranged to provide spring arms adapted to engage the ring and insure the desired pressure characteristics of the ring and proper contact between the ring and the cylinder bore.

Other objects and advantages will become apparent as this description progresses and by reference to the drawing wherein,—

Figure 1 is a fragmentary perspective view of one form of expander embodying my invention, and illustrating one spring member in assembled relation upon the supporting band and another spring member in separated relation ready to be mounted upon such band;

Fig. 2 is a view similar to Fig. 1 of a modified form of expander embodying my invention; and Fig. 3 is a sectional plan view of a piston showing the expander of Fig. 1 in position behind a piston ring.

In the drawing, I have illustrated my invention as applied to a piston 10 having a ring groove 11 in which a piston ring 12 is mounted. An expander 13 embodying my invention is mounted in the ring groove 11 behind the piston ring 12.

The expander shown in Fig. 1 includes a supporting band 14 and a plurality of spring members 15. The supporting band is, preferably, of substantially the same width as the piston ring groove 11, and it is provided at intervals throughout its length with pairs of laterally extending lugs 16 which, as will be described further hereinafter, serve for attachment of the spring members 15. The supporting band 14 is, preferably, cut and formed from a sheet of soft steel, and the length of the band (Fig. 3) is slightly less than the circumference of the bottom of the ring groove 11.

The spring members 15 are each constructed from a single piece of spring wire formed to a closed figure of somewhat rectangular loop shape. Each spring member 15 has its mid-portion 17 bowed inwardly to seat against the supporting band 14 and to provide oppositely extending spring arms 18 that overlie the supporting band 14 in spaced and substantially parallel relation thereto. In mounting the spring members 15 upon the supporting band 14, the mid-portion 17 of each spring member is seated at and between the respective pair of band lugs 16, and the latter are then turned over and clinched upon the adjacent wires of the spring member as clearly shown in Fig. 1. The ring-contacting portions 19 at the outer ends of the spring arms 18 may be slightly bowed or curved as shown.

In the use of the expander of Fig. 1, the supporting band 14 is mounted within the ring groove 11 in snug engagement with the bottom of the latter. The spring arms 18 of the spring members engage the rear surface of the ring with sufficient expanding pressure to insure the desired pressure characteristics of the ring and the proper contact between the ring and the cylinder bore. In some cases, the expanding action of the expander may be augmented by addition of auxiliary spring members such as shown in Fig. 2.

More particularly, the structure shown in Fig. 2 is similar to that of Fig. 1, except that spring units including a main spring member 20 and an auxiliary spring member 21 are employed. The main spring member 20 is similar to the spring member 15 of Fig. 1 and the auxiliary spring member 21 is similar to the main spring member 20, except that it is of reduced width and length. That is to say the auxiliary spring member 21 is, preferably, of a width that will fit snugly within the main spring member 20, and it is of such length that its ends terminate near the central portions of the spring arms 22 of the main spring member 20. The spring members 20 and 21 are mounted as a unit upon the supporting band 23 by clinching band lug 24 thereupon (Fig. 2) similarly to the clinching of the band lugs 16 of Fig. 1. In the use of this form of my invention, the strains or "load" to which the spring members are subjected are distributed between them.

It will be understood that while I have shown only two forms of structure embodying my invention, other changes in details and arrangement of parts may be resorted to without departing from the spirit and scope of my invention as defined by the claims that follow.

I claim:

1. A piston ring expander comprising a metallic supporting band having spaced lugs along its opposite edges with the lugs along one edge aligned with the lugs along the other edge to provide spaced pairs of aligned lugs, and a plurality of spaced-apart spring members, one for each pair of lugs, carried by said band, each said spring member taking the form of a single piece of wire shaped to provide a rectangular-like loop having its mid-portion bowed inwardly away from the plane of the loop to seat upon said band between its respective pair of said lugs, the end portions of said spring members constituting spring arms overlying said band in face-to-face spaced relation, said lugs being turned over and clinched upon the adjacent wire sides of said spring member.

2. A piston ring expander comprising a supporting band formed of metal, spaced pairs of aligned lugs formed along the opposite side edges of said band, and spring members carried by said band, each said spring member having the form of a spring wire loop of rectangular-like shape bowed inwardly at its intermediate portion to seat upon said band between its respective pair of said lugs, the end portions of said spring member constituting spring arms overlying said band in spaced relation, and said lugs being turned over and clinched upon the adjacent wire sides of said spring member.

3. A piston ring expander comprising a supporting band, spring units carried by said band and adapted to engage the inner surface of the piston ring, each spring unit including a pair of spring members each formed of spring wire of closed loop form and having an intermediate portion adapted to seat upon said band and end portions overlying said band in spaced relation, and means on said band for securing said spring members thereto as a single spring unit.

4. A piston ring expander comprising a supporting band, spring units carried by said band and adapted to engage the inner surface of the piston ring, each spring unit including a pair of spring members each formed of spring wire of closed rectangular-like loop form with one of said spring members shorter and narrower than the other so as to fit within the other, the intermediate portions of both said spring members being similarly bowed toward said band to seat upon the latter with their end portions overlying said band in spaced relation, and means along the side edges of said band engaging the intermediate portions of both said spring members for securing said spring members as a spring unit to said band.

RALPH R. TEETOR.